United States Patent Office 3,684,519
Patented Aug. 15, 1972

3,684,519
FISH BAIT AND METHOD OF MAKING THE SAME
Elvey S. Combs, 3136 Glenwood St.,
Eureka, Calif. 95501
No Drawing. Filed Feb. 24, 1970, Ser. No. 13,831
Int. Cl. A23k 1/18
U.S. Cl. 99—3     7 Claims

ABSTRACT OF THE DISCLOSURE

A fish bait made of comminuted organic tissue particles dispersed in a solidified polyacrylamide gel. When stored out of contact with water, the gel tightly compacts around the tissue particles and prevents biological degradation of of tissue. When immersed in water the gel swells to allow bacterial action to take place in the tissue. The tissue odor is released through the surrounding gel in the same manner as from tissue alone, and the gel protects the tissue from decomposition.

BACKGROUND OF THE INVENTION

This invention relates to bait used for fishing. Although it has particular suitability for crab fishing, it may also be used in other instances wherein natural bait would be used.

The normal manner of crab fishing is by use of crab pots which are set in place on the ocean floor. The pots are baited with hunks of squid, herring, clam or other fish which is attractive to crabs. Normally, such bait will be effective in salt water for only about six hours, after which time it will have decomposed to such an extent that it no longer attracts crabs.

In addition to its short useful life in the pots, such bait is difficult to keep before use. Without refrigeration, natural bait decomposes very rapidly. In order to store it for a longer time, refrigeration is necessary. Long-term storage, as may be necessary if out-of-season bait is to be used, requires freezing, with an attendant problem of damage to tissue cells from ice crystal formation.

It is the primary object of this invention to provide a bait utilizing natural tissue, which may be stored for long periods of time without refrigeration, which will be as effective a bait as such tissue used in its natural state, and which remains effective in use for a much longer period of time than natural bait.

SUMMARY OF THE INVENTION

The object of the invention is achieved by providing a bait made from a dispersion of comminuted organic tissue particles in a solidified acrylamide gel. In the comminution of tissues, the surface cell walls are broken down and the subsequent dispersion of the tissue particles in the gel, in effect, causes the walls of the tissue cells to be reformed by the gel. An acrylamide gel is used since it is compatible with natural protein material, has no deleterious effect thereon, does not interfere with enzyme activity and permits protein ion migration therethrough.

The bait may be stored for long periods of time without refrigeration because the gel, when solidified, has a very dense molecular structure which prevents ambient air and bacteria from coming into contact with the tissue and causing biological degradation of the tissue.

When placed in water, the gel absorbs water, the molecules of which enter into the interstices of the acrylamide molecules, causing the gel to swell, thereby allowing bacterial action to take place within the tissue. The odor of the tissue is released through the solidified gel in the same manner as through natural cell walls, so that fish will be attracted to the bait. At the same time, the gel will physically protect the tissue from decomposition, thus prolonging the effective life of the bait.

Other objects and advantages will become apparent in the course of the following detailed description.

DETAILED DESCRIPTION OF THE INVENTION

The suitability of polyacrylamide gels in the separation of protein fractions of normal human serum by electrophoresis is known, and is described in the article "Gel Electrophoresis," Annals of the New York Academy of Sciences, vol. 121, Article 2, pages 305–650, Dec. 28, 1964.

Polyacrylamide gels are synthetic polymers formed from low molecule weight chemicals obtainable in high purity. The pore size of polyacrylamide gels can be varied through a wide range by adjustment of the monomer concentration, and preparation of the gels is a simple and rapid procedure. These gels are transparent to visible radiation through a wide range of monomer concentrations. Polyacrylamide gel lattices are carbon-carbon polymers with pendant amide groups, are relatively inert chemically, and have few or no ionic side groups. The gels are also mechanically strong over a wide range of pore sizes, and the mechanical properties can be easily adjusted by changing the proportions of the gel ingredients.

As has been found in electrophoresis studies, protein ions will migrate through the interstices of the gel, but the gel will impose an appreciable frictional resistance to the passage of ions, provided the size of the pores of the gel lattice approaches the dimensions of the migrating ions. This property is important in such studies since the migration of various protein fraction will be differentially retarded by degrees proportioned to their dimensions, and thus the resolution of different protein fractions is greatly increased.

Applicant has discovered that the properties of polyacrylamide gels can be utilized to produce a fish bait that will be as attractive to fish as organic tissue matter but will have far superior keeping qualities as compared to organic tissue matter alone.

In the production of the bait, a natural organic tissue material is selected from those foods which are attractive to the particular species of fish that is desired to be caught. By way of example, squid, herring and clams are commonly used as bait in crab pots. In the following examples, squid has been used as the protein basis of the bait.

The organic tissue, in this case squid, is first cut into small chunks and then comminuted in a chopping mill. In the batches made and tested, the tissue has been comminuted in a conventional kitchen-type blender. The length of time that the material is operated upon by the chopping mill must be sufficient for the exposed cell walls of the tissue particles to be broken down, but yet not of such duration that the material is ground so fine as to break up the protein molecules. In the preparation of the examples listed below, it has been found that 15 minutes in a blender gives satisfactory results.

A polyacrylamide gel having a small pore size is made up from:

(1) Acrylamide, $CH_2CHCONH_2$.—Acrylamide is a white crystalline solid that is best stored in a cool, dark, dry place to reduce slow spontaneous polymerization and hydrolysis. The average shelf life of commercial samples is several years.

(2) N,N'-methylenebisacrylamide, $$CH_2(NHCOCH{:}CH_2)_2$$

(BIS).—BIS is a white crystalline solid best stored in a cool, dark, dry place. Slow spontaneous polymerization may occur during long storage.

(3) N,N,N′,N′-Tetramethylethylenediamine, $$(CH_3)_2NCH_2N(CH_3)_2,$$

(TEMED).—TEMED comes in liquid form.

(4) Ammonium persulfate, $(NH_4)_2S_2O_8$.—This is a white crystalline matter.

The acrylamide and BIS are made up together in an aqueous solution, 28 grams of acrylamide and .735 gram per 100 milliliters of water. Together, these will form a polymer with the acrylamide acting as the monomer and the BIS acting as the cross linking agent. The TEMED solution, which acts as a catalyst, is made up separately, .23 gram of TEMED per 100 milliliters of water. The ammonium persulfate is also made up separately. Solution of .7 gram and .14 gram of ammonium persulfate per 100 milliliters of water have been used successfully in the gel solution. The above solutions should be used the day they are prepared, although the persulfate solution may be stored, under refrigeration, for up to seven days.

In making up the gel, the acrylamide and BIS solution, the TEMED solution and the ammonium persulfate solution are mixed gently but thoroughly together, and the freshly comminuted fish tissue is mixed into the gel solution so that all of the tissue particles are coated with the gel solution.

The ammonium persulfate aids in the control of the gel time, and yields gels of uniform and sufficiently small pore size.

The particular concentrations and ratios of the gel constituents will vary in accordance with the particular tissue matter used and must be found by experimentation. Proportions of the bait product constituents, by volume, of different examples of a squid-based bait which have been made and used for bait purposes are as follows:

| Example | Acrylamide and bisacrylamide | TEMED | Ammonium persulfate | | Water | Comminuted squid | Grams of acrylamide per 100 milliliters of gel solution |
| --- | --- | --- | --- | --- | --- | --- | --- |
| | | | .14 | .7 | | | |
| 1 | 6 | 3 | 12 | | | 3 | 8 |
| 2 | 9 | 3 | 9 | | | 3 | 12 |
| 3 | 1.5 | 2 | | 1 | 1.5 | 4 | 7 |
| 4 | 3 | 2 | | 1 | | 4 | 14 |
| 5 | 5 | 2 | | 1 | | 3 | 17.5 |

The mixture is then allowed to gel at room temperature. It has been found that when different baits are mixed into the gel solution there is a varying inhibitive time in setting and also a variation in consistency. By way of example, the Example No. 4 listed above sets in about 20 to 30 minutes with a resulting consistency having approximately the same feeling as natural squid tissue. The setting time may be shortened by the addition of more TEMED solution, but this will also be accompanied by an increase in temperature. It has also been found that the consistency of the solidified gell will vary in accordance with the amount of acrylamide in the gel solution. With a gel solution having 1 gram of acrylamide per 100 milliliters, the gel will require a considerably longer time to solidify and will set to a cohesive but soupy consistency. A gel solution having 20 grams of acrylamide per 100 milliliters will set more rapidly and to a hard, rocklike consistency.

The gel solution is colorless and the final bait product takes on the color of the tissue matter mixed therein.

As the bait product is formed, the surface protein molecules of the tissue particles enter into the interstices of and link with the molecular chains of the acrylamide so that the acrylamide compacts around the tissue particles, and, in effect, reforms the cell walls of the tissue which had been broken down in the comminution process.

When stored out of contact with water, the pore size of the gel molecules is sufficiently small to inhibit bacterial degradation of the tissue material or the release of any appreciable fish odor. For this reason, the bait product may be stored for months without refrigeration. The bait product may be stored in air-tight containers, such as glass jars or sealed plastic bags. For short periods of time, the bait product may be stored in open air although prolonged exposure to open air will cause dehydration of the gel.

Although the solidified gel is insoluble in water, it is water-absorbent, a property which enables the product to be used as a bait. When immersed, the absorbed water causes the gel to swell, and allows bacteriological and enzymic action to start in the fish tissue. The odor of the tissue is released from the tissue through the gel in essentially the same manner as tissue odor is released through the cell walls of natural bait.

The bait product degrades very slowly in fresh water. Tests of the product have shown that it can be immersed in fresh water for a month and still remain attractive to crabs. Eventually, the swollen gel covering of the tissue particles will crumble upon prolonged exposure to water, allowing the tissue to decompose and become ineffective as bait.

Specimens of the bait product have been immersed in water to cause swelling of the solidified gel, the product being then placed in a test tube and exposed to air. Visible mold formed on the product in about four days. However, this mold was only on the surface of the product and did not penetrate the product. By way of contact, natural tissue will likewise exhibit surface mold formation after a similar exposure to air, but the mold will be found to have formed throughout the tissue. Decomposition of the tissue is caused by this internal mold growth, and these tests demonstrate the effectiveness of the gel in protecting against such adverse bacteriological action. It is believed that the interior formation of mold is inhibited in the present bait by the small pore size of the gel molecules in the interior of the product which have not yet been swelled from water absorption.

The present bait product degrades much more rapidly in salt water than in fresh water. It is believed that immersion in salt water creates an osmotic condition which causes a pressure in the tissue material to be exerted outwardly against the solidified gel surrounding the tissue so as to produce a more rapid crumbling of same. However, experience shows that the bait product will be effective for at least 48 hours in sea water before the product decomposes to such an extent that it is no longer attractive to crabs. By way of comparison, fresh or frozen natural bait will only last for about 6 hours under the same conditions before it becomes ineffective as bait.

As previously mentioned, the bait product can vary in consistency from fairly soupy to rock-hard. Either extreme will still be effective as a bait. A soft consistency will give a more rapid action in the release of odor, but the product will have a shorter useful life. A hard consistency will last longer, but will have a slower response. If desired, a soft-consistency product can have cotton or similar material incorporated therein before solidification, so that the bait will have sufficient integrity to be used on a hook as effectively as natural bait.

The bait product depends for its effectiveness, as do most baits, upon the mission of odor. Experience shows that the crabs attracted to the bait by its odor will attempt to eat it. However, the gel portion of the bait product is apparently distasteful to crabs and they spit out whatever part they may have bitten off. This has an advantage in that it prevents contamination of the crabs by ingested bait, a problem which does occur at times with the use of natural bait.

By means of the present invention, it is possible to utilize natural bait that has heretofore been unfeasible. As, for example, it is well known that there are various species of plankton which form a part of the diet of crabs or other fish. Up to now there has been no way of using such plankton as a bait. However, mixing such plankton into the described gel solution will produce an effective bait.

I claim:

1. A fish bait comprised of comminuted particles of organic matter having an odor attractive to fish dispersed in an amount of solidified polyacrylamide gel sufficient to encapsulate and physically suspend the particles of said organic matter within the gel and retard the bacterial degradation thereof upon exposure to the atmosphere.

2. A fish bait as set forth in claim 1 wherein the organic matter is fish tissue.

3. A fish bait as set forth in claim 2 wherein the organic walls on the surface of the fish tissue particles are physically broken down prior to dispersing said organic matter in said gel.

4. A fish bait as set forth in claim 1 wherein the gel is comprised of acrylamide, N,N'-methylenebisacrylamide, N,N,N',N'-tetramethylethylenediamine, and ammonium persulfate.

5. A fish bait as set forth in claim 4, wherein the organic material is fish tissue.

6. A fish bait as set forth in claim 5 wherein the organic cell walls on the surface of the fish tissue particles are physically broken down prior to dispersing said organic matter in said gel.

7. The method of making a fish bait, comprising the step of:
(a) comminuting organic protein matter which has an odor attractive to fish to a point wherein the exposed cell walls of the matter are physically broken down and the protein molecules are not,
(b) subsequently dispersing the comminuted protein matter throughout an amount of gel solution comprised of acrylamide, N,N'-methylenebisacrylamide, N,N,N',N'-tetramethylenediamine and ammonium persulfate, sufficient to encapsulate and physically suspend the particles of said organic matter within the gel solution and retard the bacterial degradation thereof upon exposure to the atmosphere on solidification of said gel solution, and
(c) solidifying the gel solution.

References Cited
UNITED STATES PATENTS

| | | | |
|---|---|---|---|
| 2,555,088 | 5/1951 | Irwin | 99—3 |
| 3,578,604 | 5/1971 | Uriel | 252—316 |
| 3,410,689 | 11/1968 | Nathan | 99—3 |
| 3,046,201 | 7/1962 | White et al. | 252—316 |
| 3,265,629 | 8/1966 | Jensen | 99—169 |
| 3,361,114 | 1/1968 | Axelrod | 99—3 |

NORMAN YUDKOFF, Primary Examiner

C. P. RIBANDO, Assistant Examiner

U.S. Cl. X.R.

99—129, 157, 158, 166; 252—315